US011312190B2

(12) United States Patent
Nishio

(10) Patent No.: US 11,312,190 B2
(45) Date of Patent: Apr. 26, 2022

(54) PNEUMATIC TIRE

(71) Applicant: The Yokohama Rubber Co., LTD., Tokyo (JP)

(72) Inventor: Koji Nishio, Hiratsuka (JP)

(73) Assignee: The Yokohama Rubber Co., LTD.

( * ) Notice: Subject to any disclaimer, the term of this patent is extended or adjusted under 35 U.S.C. 154(b) by 202 days.

(21) Appl. No.: 16/478,828

(22) PCT Filed: Jan. 11, 2018

(86) PCT No.: PCT/JP2018/000503
§ 371 (c)(1),
(2) Date: Jul. 17, 2019

(87) PCT Pub. No.: WO2018/135374
PCT Pub. Date: Jul. 26, 2018

(65) Prior Publication Data
US 2020/0156418 A1 May 21, 2020

(30) Foreign Application Priority Data
Jan. 23, 2017 (JP) .............................. JP2017-009676

(51) Int. Cl.
*B60C 15/04* (2006.01)
(52) U.S. Cl.
CPC ........ *B60C 15/04* (2013.01); *B60C 2015/046* (2013.01); *B60C 2015/048* (2013.01)
(58) Field of Classification Search
CPC .............. B60C 15/04; B60C 2015/046; B60C 2015/048; B29D 30/48; B29D 2030/485; B29D 2030/487; B21F 37/00
(Continued)

(56) References Cited

U.S. PATENT DOCUMENTS 4,216,814 A * 8/1980 Grosch .................. D07B 1/062
152/540
4,998,575 A    3/1991 Kanamaru
(Continued)

FOREIGN PATENT DOCUMENTS

EP     1 066 993     1/2001
JP     H02-037003    2/1990
(Continued)

OTHER PUBLICATIONS

Keiichi Kurita, JP-2014172412-A, machine translation. (Year: 2014).*
(Continued)

*Primary Examiner* — Robert C Dye
*Assistant Examiner* — Sedef E Paquette
(74) *Attorney, Agent, or Firm* — Thorpe North & Western

(57) ABSTRACT

This pneumatic tire includes bead cores formed by winding a bead wire. In a cross-sectional view of the bead core, the bead core has a wire array structure of a hexagon formed by winding the bead wires in a close-packed manner. The hexagon is a projecting hexagon with an obtuse internal angle at every vertex. A layer number M of wire cross sections in a Y-axis direction and a maximum value N_max of an array number N of the wire cross sections in an X-axis direction satisfy 0.75≤M/N_max≤1.30. A distance A in a lateral direction from a vertex of the hexagon on the innermost side in the lateral direction to the centroid of the hexagon, and a distance B in the lateral direction from a vertex of the hexagon on the outermost side in the lateral direction to the centroid of the hexagon, satisfy 1.05≤B/A.

18 Claims, 25 Drawing Sheets

(58) Field of Classification Search
USPC .......................... 152/539, 540, 544; 156/136
See application file for complete search history.

(56) References Cited

U.S. PATENT DOCUMENTS

| | | | | |
|---|---|---|---|---|
| 5,711,830 A | * | 1/1998 | Neddenriep | ........... D07B 1/062 |
| | | | | 152/540 |
| 2002/0000276 A1 | * | 1/2002 | Nakamura | ................ B60C 9/14 |
| | | | | 152/209.11 |
| 2003/0106627 A1 | | 6/2003 | Tonezzer et al. | |

FOREIGN PATENT DOCUMENTS

| | | | |
|---|---|---|---|
| JP | H02-286408 | | 11/1990 |
| JP | H06-032124 | | 2/1994 |
| JP | 09240223 A | * | 9/1997 |
| JP | 2001/0010311 | | 1/2001 |
| JP | 2001191750 A | * | 7/2001 |
| JP | 2008-202196 | | 9/2008 |
| JP | 2009-190470 | | 8/2009 |
| JP | 2010000827 A | * | 1/2010 |
| JP | 5071137 | | 11/2012 |
| JP | 2014172412 A | * | 9/2014 |
| JP | 2014-201168 | | 10/2014 |
| WO | WO 01/54929 | | 8/2001 |

OTHER PUBLICATIONS

Yutaka Takasuka, JP-2010000827-A, machine translation. (Year: 2010).*
Takahiro Kimura, JP-2001191750-A, machine translation. (Year: 2001).*
Yasuhiko Kobayashi, JP-09240223-A, machine translation. (Year: 1997).*
International Search Report for International Application No. PCT/JP2018/000503 dated Apr. 17, 2018, 4 pages, Japan.

* cited by examiner

|  | Conventional Example 1 | Conventional Example 2 | Comparative Example 1 | Comparative Example 2 | Comparative Example 3 | Comparative Example 4 |
|---|---|---|---|---|---|---|
| Wire array structure | FIG. 10 | FIG. 11 | FIG. 12 | FIG. 13 | FIG. 14 | FIG. 15 |
| Total number of winding times Na [times] | 50 | 39 | 47 | 47 | 55 | 72 |
| M/N_max | 0.60 | 1.00 | 1.14 | 0.88 | 1.00 | 0.73 |
| B/A | 1.15 | 1.82 | 1.04 | 1.04 | 1.04 | 1.05 |
| N12 | 8 | 7 | 5 | 6 | 6 | 8 |
| N23 | 3 | — | 3 | 3 | 3 | 4 |
| N12-N45 | — | — | 1 | 1 | 1 | 1 |
| N34-N61 | — | — | 1 | 1 | 1 | 1 |
| N56-N23 | 0 | — | 1 | 1 | 1 | 1 |
| N61-N23 | 1 | — | 2 | 1 | 2 | 0 |
| N_max-N12 | 2 | 0 | 2 | 2 | 2 | 3 |
| Toe-deformation resistance | 100 | 79 | 95 | 95 | 105 | 128 |
| Strength efficiency | 100 | 102 | 102 | 102 | 98 | 91 |
| Low cost | 100 | 149 | 149 | 138 | 116 | 83 |

FIG. 9A

| | Comparative Example 5 | Comparative Example 6 | Comparative Example 7 | Comparative Example 8 | Comparative Example 9 | Comparative Example 10 |
|---|---|---|---|---|---|---|
| Wire array structure | FIG. 16 | FIG. 17 | FIG. 18 | FIG. 19 | FIG. 20 | FIG. 21 |
| Total number of winding times Na [times] | 51 | 50 | 51 | 51 | 49 | 54 |
| M/N_max | 0.60 | 0.88 | 0.46 | 0.78 | 0.46 | 0.60 |
| B/A | 1.03 | 1.00 | 0.98 | 1.00 | 1.00 | 1.00 |
| N12 | 8 | 6 | 9 | 6 | 9 | 8 |
| N23 | 3 | 3 | 3 | 4 | 3 | 3 |
| N12-N45 | 1 | 0 | -1 | 0 | 0 | 0 |
| N34-N61 | 1 | 0 | -1 | 0 | 0 | 0 |
| N56-N23 | 0 | 0 | 1 | 0 | 0 | 1 |
| N61-N23 | 2 | 2 | 2 | 3 | 2 | 2 |
| N_max-N12 | | | | | | |
| Toe-deformation resistance | 102 | 94 | 96 | 93 | 97 | 101 |
| Strength efficiency | 102 | 96 | 96 | 93 | 101 | 95 |
| Low cost | 102 | 116 | 73 | 128 | 83 | 88 |

FIG. 9B

| | Comparative Example 11 | Comparative Example 12 | Example 1 | Example 2 | Example 3 | Example 4 | Example 5 |
|---|---|---|---|---|---|---|---|
| Wire array structure | FIG. 22 | FIG. 23 | FIG. 3 | FIG. 5 | FIG. 6 | FIG. 7 | FIG. 8 |
| Total number of winding times Na [times] | 46 | 48 | 51 | 49 | 50 | 54 | 38 |
| M/N_max | 0.50 | 0.67 | 1.00 | 1.14 | 1.29 | 1.13 | 1.00 |
| B/A | 0.97 | 1.00 | 1.07 | 1.09 | 1.08 | 1.12 | 1.11 |
| N12 | 8 | 7 | 6 | 6 | 5 | 6 | 6 |
| N23 | 3 | 3 | 3 | 2 | 3 | 3 | 2 |
| N12-N45 | -1 | 0 | 2 | 2 | 2 | 3 | 3 |
| N34-N61 | -1 | 0 | 2 | 2 | 2 | 3 | 3 |
| N56-N23 | -1 | 0 | 2 | 2 | 2 | 3 | 3 |
| N61-N23 | 1 | 1 | 1 | 3 | 2 | 1 | 1 |
| N_max-N12 | 2 | 2 | 2 | 1 | 2 | 2 | 1 |
| Toe-deformation resistance | 88 | 93 | 107 | 108 | 105 | 118 | 78 |
| Strength efficiency | 98 | 98 | 107 | 113 | 107 | 112 | 104 |
| Low cost | 88 | 109 | 138 | 125 | 149 | 138 | 157 |

FIG. 9C

CONVENTIONAL EXAMPLE 1

CONVENTIONAL EXAMPLE 2

COMPARATIVE EXAMPLE 1

COMPARATIVE EXAMPLE 2

COMPARATIVE EXAMPLE 3

COMPARATIVE EXAMPLE 4

COMPARATIVE EXAMPLE 5

COMPARATIVE EXAMPLE 6

COMPARATIVE EXAMPLE 7

COMPARATIVE EXAMPLE 8

COMPARATIVE EXAMPLE 9

COMPARATIVE EXAMPLE 10

COMPARATIVE EXAMPLE 11

COMPARATIVE EXAMPLE 12

PNEUMATIC TIRE

TECHNICAL FIELD

The present technology relates to a pneumatic tire and particularly relates to a pneumatic tire that can efficiently suppress lifting deformation of a bead toe and properly ensure core-collapse resistance of a bead core.

BACKGROUND ART

In general, there is a demand for bead toe lifting deformation to be suppressed in heavy duty tires mounted on a truck or bus. The lifting deformation as described above is not preferable because it causes the ease of tire re-inflation to be deteriorated, and also causes the base tire to be suitable for tire retreading. The known technology described in Japan Patent No. 5071137 and Japan Unexamined Patent Publication Nos. H02-037003 and H02-286408 are heavy duty tires designed with this problem in mind.

To suppress the lifting deformation of the bead toe described above, it is effective to increase a winding number of bead wires constituting a bead core. Unfortunately, an increase in the winding number of bead wires causes a problem in that material costs of the bead cores and peripheral members (e.g., a rubber material such as bead fillers) increase.

SUMMARY

The present technology provides a pneumatic tire that can efficiently suppress lifting deformation of a bead toe and properly ensure core-collapse resistance of a bead core.

A pneumatic tire according to an embodiment of the present technology includes a pair of bead cores each formed by winding a bead wire multiple times in an annular shape, the bead cores each having a wire array structure in the shape of a hexagon formed by winding one or more of the bead wires in a close-packed manner in a cross-sectional view each of the bead cores in its radial direction, the hexagon being a projecting hexagon with an obtuse internal angle at every vertex, the vertex of the hexagon on a radially innermost side of each of the bead cores being defined as the first vertex P1, a side of the hexagon extending outward in a tire lateral direction and including the first vertex P1 being defined as a first side S12, an axis parallel to the first side S12 of the hexagon being defined as an X-axis, and an axis perpendicular to the X-axis being defined as a Y-axis, a layer number M of wire cross sections in a Y-axis direction, and a maximum value N_max of an array number N of wire cross sections in an X-axis direction, having a relationship satisfying $0.75 \leq M/N\_max \leq 1.30$, and a distance A in the tire lateral direction from the vertex of the hexagon on the innermost side in the tire lateral direction to the centroid of the hexagon, and a distance B in the tire lateral direction from the vertex of the hexagon on the outermost side in the tire lateral direction to the centroid of the hexagon, having a relationship satisfying $1.05 \leq B/A$.

In addition, a pneumatic tire according to an embodiment of the present technology includes a pair of bead cores each formed by winding a bead wire multiple times in an annular shape, the bead cores each having a wire array structure in the shape of a hexagon formed by winding one or more of the bead wires in a close-packed manner in a cross-sectional view of each of the bead cores in its radial direction, the hexagon being a projecting hexagon with an obtuse internal angle at every vertex, the vertex of the hexagon on a radially innermost side of each of the bead cores being defined as the first vertex P1, a side of the hexagon extending outward in a tire lateral direction and including the first vertex P1 being defined as a first side S12, an axis parallel to the first side S12 of the hexagon being defined as an X-axis, and an axis perpendicular to the X-axis being defined as a Y-axis, an array number of the wire cross sections in each side of the hexagon being defined as N12, N23, N34, N45, N56, and N61 in order from the first side S12 of the hexagon outward in the tire lateral direction, an array number of wire cross sections in each of three pairs of opposing sides of the hexagon satisfying the relationship $2 \leq N12-N45=N34-N61=N56-N23 \leq 3$.

In the pneumatic tire according to an embodiment of the technology, (1) the bead core is formed by winding the bead wires in a close-packed manner and has a wire array structure in the shape of a projection hexagon with obtuse internal angles, thus there is an advantage in that the core-collapse resistance of the bead core is properly ensured. In addition, (2) the wire array structure of the bead core is optimized, thus there is an advantage in that the lifting deformation of the bead core can be effectively suppressed.

BRIEF DESCRIPTION OF DRAWINGS

FIGS. 9A-9C include a table showing the results of performance tests of pneumatic tires according to embodiments of the present technology.

DETAILED DESCRIPTION

Embodiments of the present technology are described in detail below with reference to the drawings. However, the present technology is not limited to these embodiments. Moreover, components of the present embodiments include elements that are substitutable, maintain consistency with the technology, and obviously substitutable elements. Furthermore, the modifications described in the present embodiments can be combined as desired within the scope apparent to one skilled in the art.

Pneumatic Tire

Figure 1:
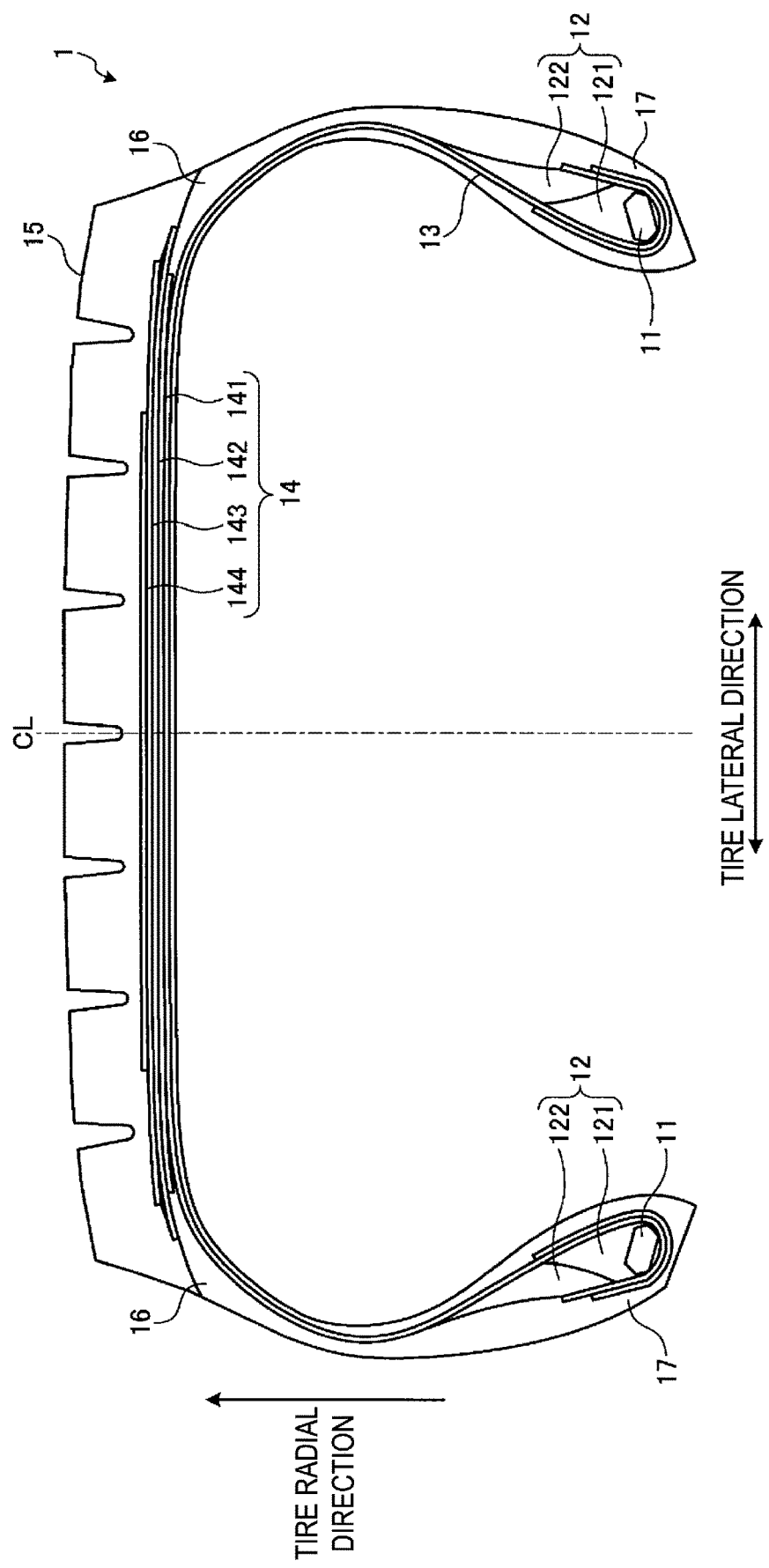
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. The same drawing is a cross-sectional view illustrating a half region in a cross-sectional view in a tire radial direction. In addition, the same drawing illustrates a heavy duty radial tire that is mounted on a truck, a bus, and the like for long-distance transport as an example of a pneumatic tire 1.

In FIG. 1, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each have an annular structure formed by winding a bead wire made of steel multiple times in a tire circumferential direction, and constitutes a core of the corresponding right and left bead portions. Each of the pair of bead fillers 12, 12 is formed of a lower filler 121 and an upper filler 122. Each of the pair of bead fillers 12, 12 is disposed outward of the corresponding one of the pair of bead cores 11, 11 in the tire radial direction and constitutes the corresponding bead portion.

The carcass layer 13 extends between the left and right bead cores 11, 11 in a toroidal shape, forming the framework of the tire. Additionally, both end portions of the carcass layer 13 are turned back from in to out in the tire lateral direction wrapping around the bead cores 11 and the bead fillers 12 and fixed. The carcass layer 13 is formed by performing a rolling process on carcass cords made of steel or an organic fiber material (e.g., nylon, polyester, rayon, or the like), having been coated with coat rubber. The carcass layer 13 has a carcass angle (defined as an inclination angle in the longitudinal direction of the carcass cords with respect to the tire circumferential direction), as an absolute value, ranging from 85 degrees to 95 degrees.

The belt layer 14 is formed by layering a large-angle belt 141, a pair of cross belts 142, 143, and a supplemental belt 144, in the order from inside in the tire radial direction, and is disposed wound over the outer circumference of the carcass layer 13. The large-angle belt 141 is formed by performing a rolling process on a plurality of belt cords made of steel, having been coated with coat rubber. The large-angle belt 141 has a belt angle (defined as an inclination angle in the longitudinal direction of the belt cords with respect to the tire circumferential direction), as an absolute value, ranging from 45 degrees to 70 degrees. The pair of cross belts 142, 143 is formed by performing a rolling process on a plurality of belt cords made of steel, having been coated with coat rubber. The cross belts 141, 142 each have a belt angle, as an absolute value, ranging from 10 degrees to 55 degrees. The pair of cross belts 142, 143 has respective belt angles with signs opposite to each other, and is layered and the belt cords are intersected each other in a longitudinal direction thereof (having so-called a crossply structure). The supplemental belt 144 is formed by performing a rolling process on a plurality of belt cords made of steel, having been coated with coat rubber. The supplemental belt 144 has a belt angle, as an absolute value, ranging from 10 degrees to 55 degrees. The belt angle of the supplemental belt 144 is set to the same sign as that of the belt angle of the cross belt 143 on an outer diameter side.

The tread rubber 15 is disposed outward of the carcass layer 13 and the belt layer 14 in the tire radial direction and constitutes a tread portion. Each of the pair of sidewall rubbers 16, 16 is disposed outward of the carcass layer 13 in the tire lateral direction and constitutes the corresponding one of left and right sidewall portions. Each of the pair of rim cushion rubbers 17, 17 is disposed inward of the corresponding one of the left and right bead cores 11, 11 and a turned back portion of the carcass layer 13 in the tire radial direction. Each of the pair of rim cushion rubbers 17, 17 constitutes a contact surface with a rim flange of the corresponding one of the left and right bead portions.

Bead Core

Figure 2:
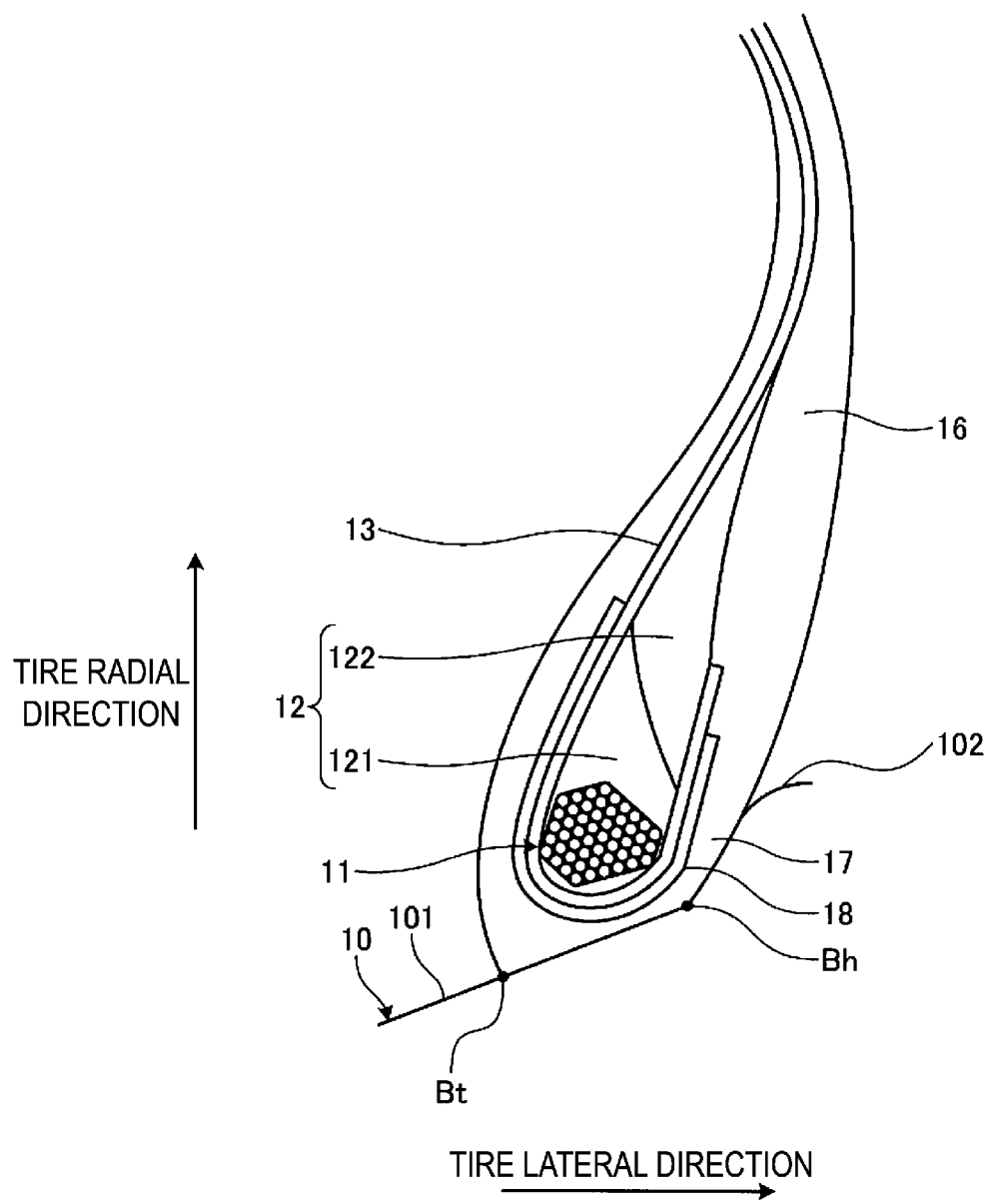
FIG. 2 is an enlarged cross-sectional view illustrating a bead portion of the pneumatic tire illustrated in FIG. 1.
Figure 3:
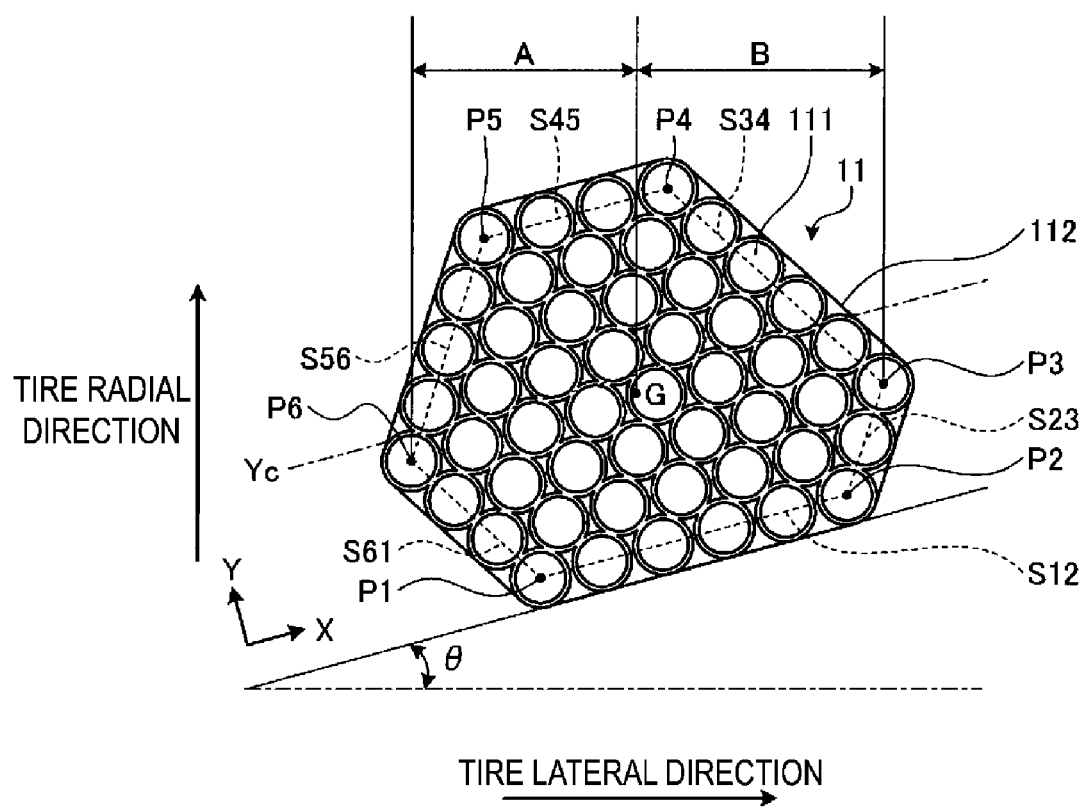
FIG. 3 is an explanatory diagram illustrating a bead core of the bead portion illustrated in FIG. 2.
Figure 4:
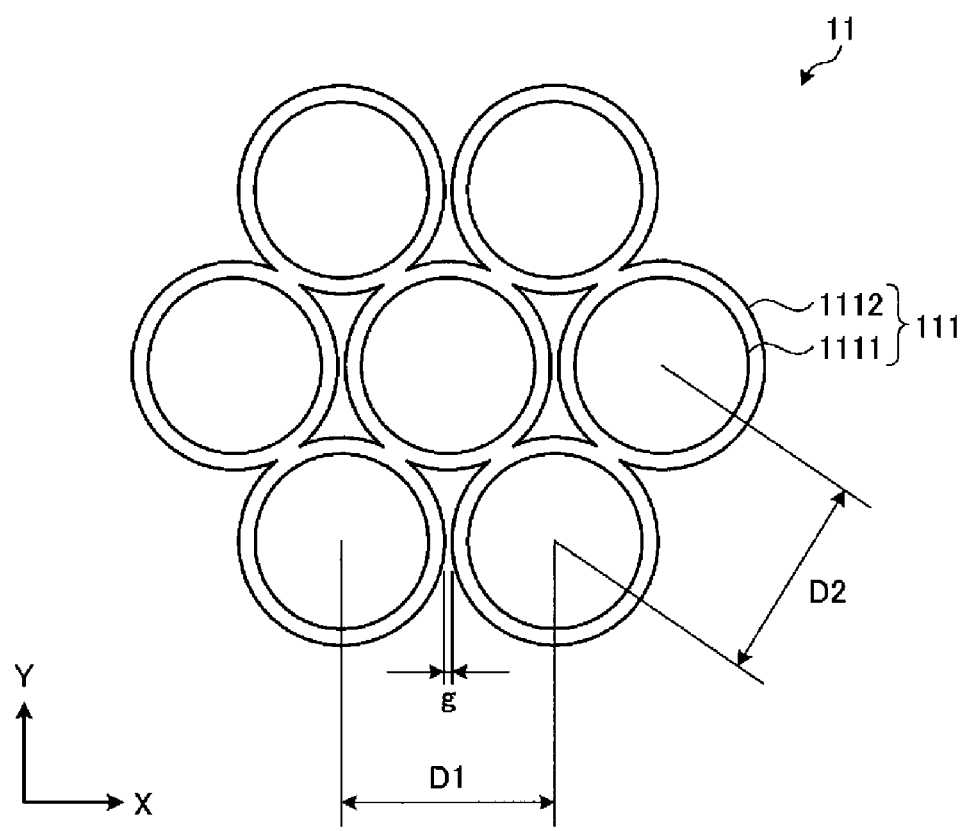
FIG. 4 is an explanatory diagram illustrating the bead core of the bead portion illustrated in FIG. 2.

FIG. 2 is an enlarged cross-sectional view illustrating a bead portion of the pneumatic tire 1 illustrated in FIG. 1. FIGS. 3 and 4 are each an explanatory diagram illustrating a bead core 11 of the bead portion illustrated in FIG. 2. In these drawings, FIG. 2 illustrates a cross-sectional view of a bead portion in a tire mounted on a rim, in a tire meridian direction, FIG. 3 illustrates an enlarged view of a single bead core 11 in an unvulcanized state, and FIG. 4 illustrates an array state of bead wires 111 in the bead core 11 illustrated in FIG. 3.

In FIG. 2, the bead core 11 has an annular structure formed by winding one or more bead wires 111 made of steel multiple times, and is embedded in each of the left and right bead portions to constitute a core thereof. The annular structure of the bead core 11 has an axis aligning with a tire rotation axis. The bead core 11 is wrapped and held in the turned back portion of the carcass layer 13. The rim cushion rubber 17 is disposed covering an inner side of the turned-up portion of the carcass layer 13 in the tire radial direction to constitute a rim fitting portion of the bead portion. In the structure of FIG. 2, an end portion of the carcass layer 13 is turned back outward in the tire lateral direction wrapping around the bead core 11 and the bead filler 12, and extends to a position exceeding a rim-fitting surface of the bead portion. In addition, a reinforcing layer 18 made of steel or an organic fiber material is disposed between the carcass layer 13 and the rim cushion rubber 17 to surround the whole of the bead core 11 along an outer peripheral surface of the turned back portion of the carcass layer 13.

As illustrated in FIG. 2, the pneumatic tire 1 is mounted on a rim 10 by fitting the bead portion onto the rim 10. Specifically, a bead base portion 101 of the rim 10 has a predetermined inclination angle with respect to a tire rotation axis direction, and the bead portion of the tire has the rim-fitting surface in a shape matching an outer peripheral surface of the bead base portion 101. When the tire is mounted on a specified rim and inflated to specified internal pressure with no load applied, a region of the rim-fitting surface from a bead toe Bt to a bead heel Bh comes into close contact with the outer peripheral surface of the bead base portion 101, and a region outward from the bead toe Bt in the tire lateral direction is fitted onto a rim flange portion 102 formed on an outer edge portion of the bead base portion 101. This causes the bead portion to be properly fitted on the rim 10 to ensure air tightness of the tire.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

FIG. 3 illustrates a cross-sectional view of the bead core 11 itself in an unvulcanized state in the radial direction. The bead core 11 is formed by winding the bead wire 111 multiple times in an annular shape, and has a predetermined wire array structure described below. Specifically, a core molding jig (not illustrated) is used to wind one or more bead wires 111 around the core molding jig with the predetermined wire array structure to form the bead core 11 in an unvulcanized state. The bead core 11 also includes a bead cover 112 made of rubber material to cover an outer circumference of the bead wires 111 wound. Then, the bead core 11 molded is pre-vulcanized before a vulcanization molding step of a green tire. Besides this, the bead core 11 in an unvulcanized state may be incorporated into a green tire by eliminating pre-vulcanization of the bead core 11, and then a vulcanization molding step of the green tire may be performed.

As illustrated in FIG. 4, the bead wires 111 each include a wire 1111 and an insulation rubber 1112 covering the wire 1111. The wire 1111 is made of steel as described above. The insulation rubber 1112 is preferably made of a rubber composition having a Mooney viscosity of 70 M or more. In addition, a heavy duty tire for a truck and a bus includes the bead wire 111 having an outer diameter within the range of from 1.70 mm to 2.20 mm. The Mooney viscosity is determined in accordance with JIS (Japanese Industrial Standard) K6300-1: 2013.

Wire Array Structure of Bead Core

In general, heavy duty tires each mounted on a truck and a bus have a problem in that lifting deformation of a bead toe during traveling on a vehicle is to be suppressed. The lifting deformation as described above is not preferable because it causes ease of re-inflation of a tire to be deteriorated, and also causes properness of a base tire to be impaired when the tire is retreaded. To suppress the lifting deformation of the bead toe described above, it is effective to increase a winding number of bead wires constituting a bead core. Unfortunately, increase in the winding number of bead wires causes a problem in that material costs of the bead cores and peripheral members (e.g., a rubber material such as bead fillers) increase.

Thus, the pneumatic tire 1 employs the following configuration to efficiently suppress lifting deformation of a bead toe and properly ensuring core-collapse resistance of the bead core 11.

In other words, as illustrated in FIG. 3, the bead core 11 has a hexagonal wire array structure formed by winding the bead wires 111 in a close-packed state in a cross-sectional view in the radial direction thereof.

As illustrated in FIG. 4, in a cross-sectional view in the radial direction of the bead core 11, the close-packed state refers to a state in which one wire cross section is adjacent to six wire cross sections arranged around the one wire cross section at an interval of approximately 60 degrees. In the wire array structure in a close-packed manner as described above, density of placement of wire cross sections of the bead core 11 increases more than a wire array structure in a lattice shape in which rows of wire cross sections are orthogonal to each other vertically and horizontally, so that core-collapse resistance of the bead core 11 is improved. In the close-packed manner described above, every pair of wire cross sections adjacent to each other does not need to be brought into contact with each other, and some pairs each may be disposed with a small gap "g" described below.

As illustrated in FIG. 3, the shape of the wire array structure is defined as a graphic obtained by connecting the center point of each of the wire cross sections constituting an outer peripheral surface of the bead core 11. One vertex of the graphic is also defined by the center point of one of the wire cross sections. Each side of the graphic is defined by the center points of two or more of the wire cross sections. However, the center points of the wire cross sections constituting one side of the graphic are not required to be strictly present on one straight line, and may be disposed with a small positional shift due to manufacturing error or the like. In the structure of FIG. 3, the wire array structure is in the shape of a hexagon with six vertices P1 to P6.

Figure 10:
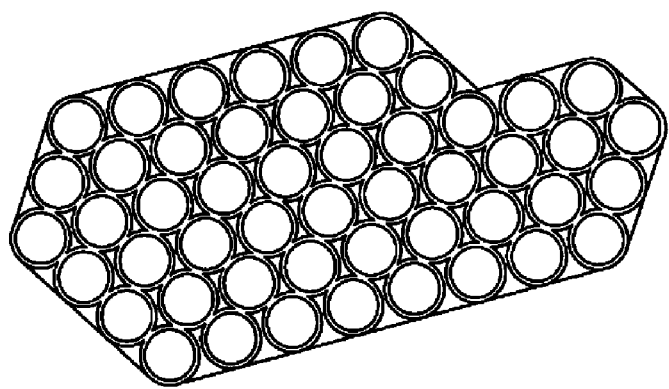
FIG. 10 is an explanatory diagram of Conventional Example 1 illustrated in FIG. 9A.
Figure 11:
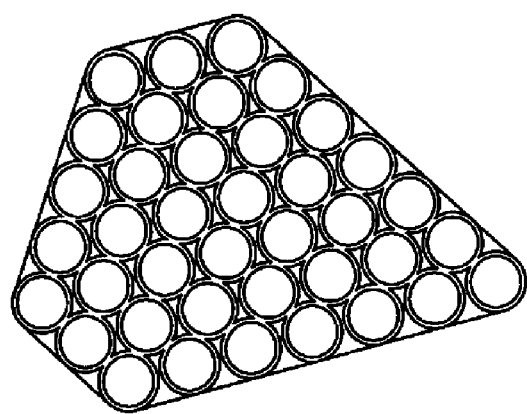
FIG. 11 is an explanatory diagram of Conventional Example 2 illustrated in FIG. 9A.
Figure 12:
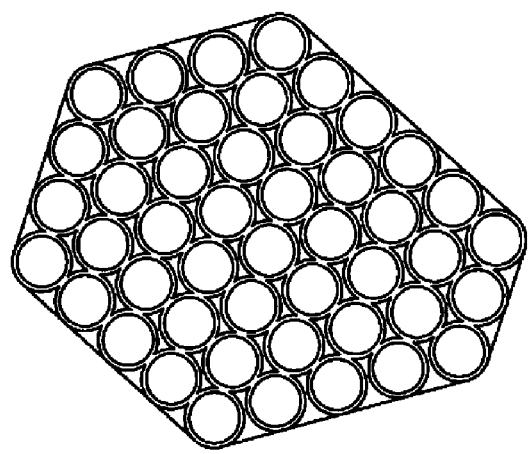
FIG. 12 is an explanatory diagram of Comparative Example 1 illustrated in FIG. 9A.
Figure 13:
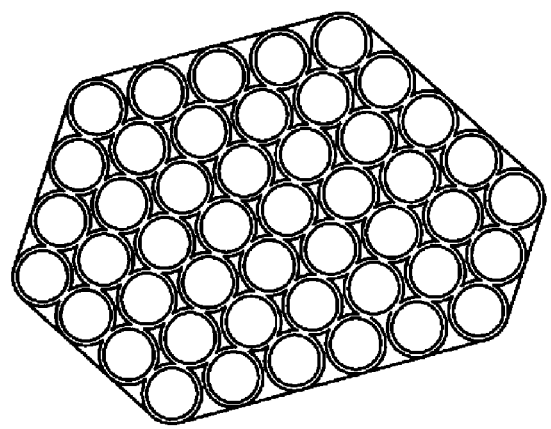
FIG. 13 is an explanatory diagram of Comparative Example 2 illustrated in FIG. 9A.
Figure 14:
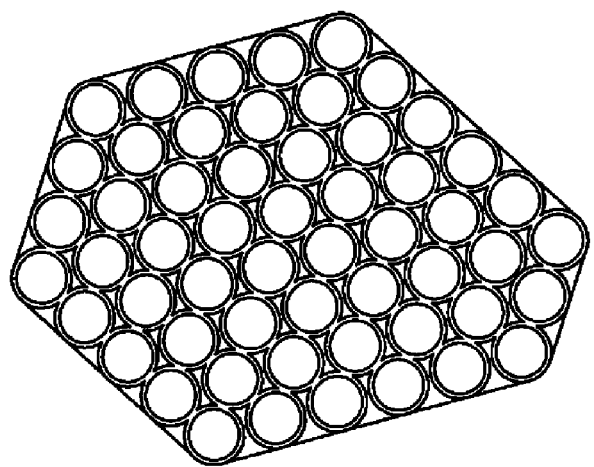
FIG. 14 is an explanatory diagram of Comparative Example 3 illustrated in FIG. 9A.
Figure 15:
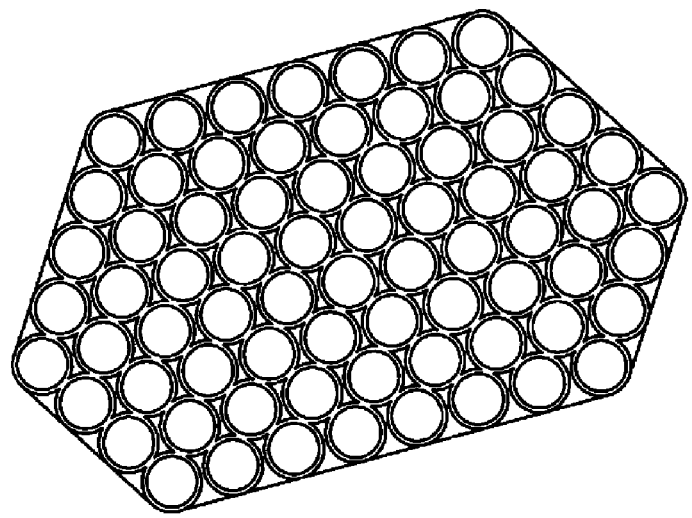
FIG. 15 is an explanatory diagram of Comparative Example 4 illustrated in FIG. 9A.
Figure 16:
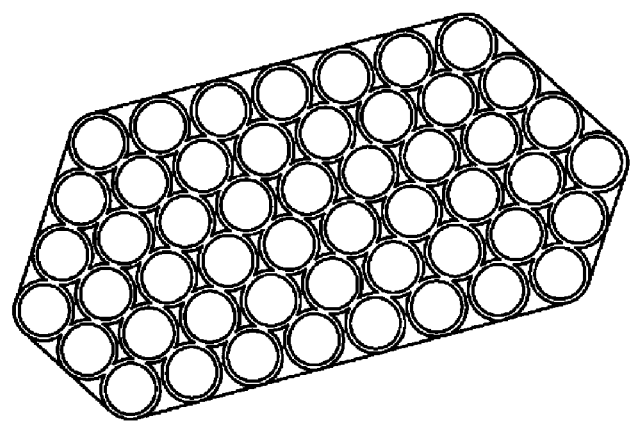
FIG. 16 is an explanatory diagram of Comparative Example 5 illustrated in FIG. 9B.
Figure 17:
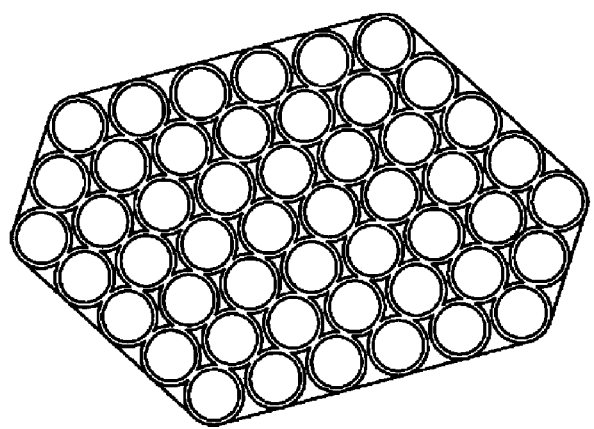
FIG. 17 is an explanatory diagram of Comparative Example 6 illustrated in FIG. 9B.
Figure 18:
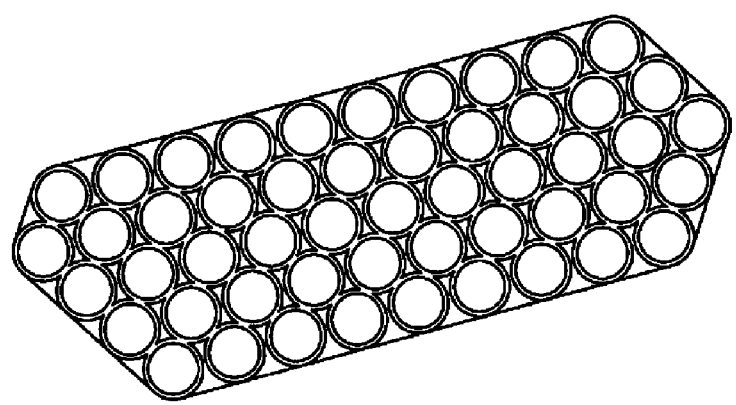
FIG. 18 is an explanatory diagram of Comparative Example 7 illustrated in FIG. 9B.
Figure 19:
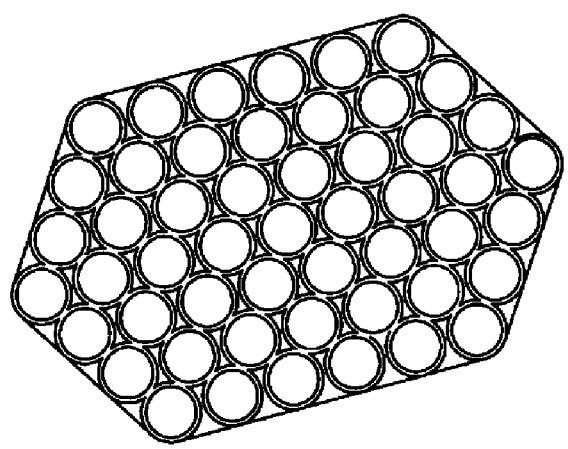
FIG. 19 is an explanatory diagram of Comparative Example 8 illustrated in FIG. 9B.
Figure 20:
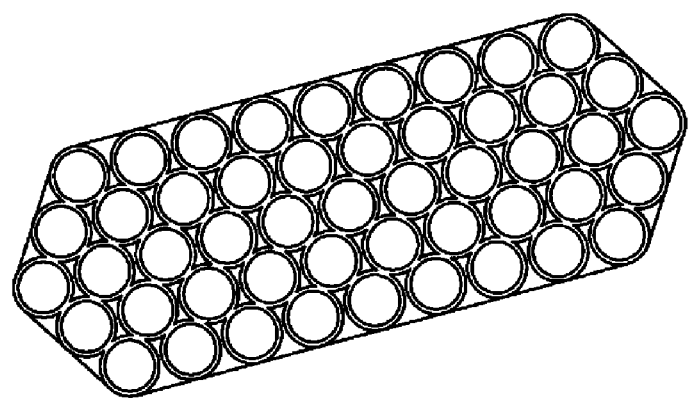
FIG. 20 is an explanatory diagram of Comparative Example 9 illustrated in FIG. 9B.
Figure 21:
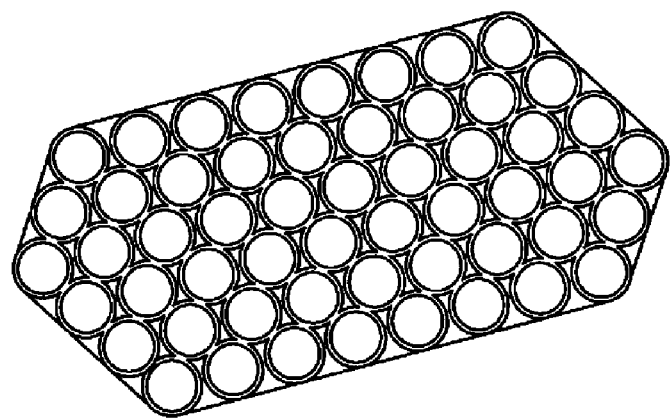
FIG. 21 is an explanatory diagram of Comparative Example 10 illustrated in FIG. 9B.
Figure 22:
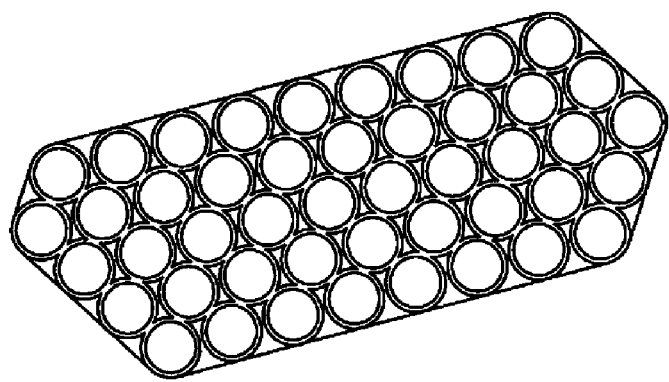
FIG. 22 is an explanatory diagram of Comparative Example 11 illustrated in FIG. 9C.
Figure 23:
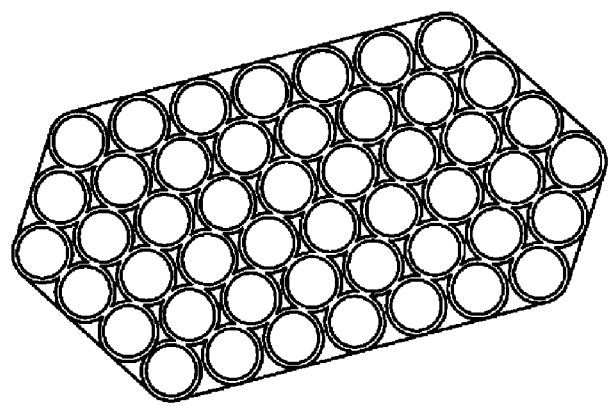
FIG. 23 is an explanatory diagram of Comparative Example 12 illustrated in FIG. 9C.

The hexagon of the wire array structure is a projecting hexagon with vertices each of which has an obtuse internal angle. That is, all of the internal angles of the hexagon are within the range of from 90 degrees to 180 degrees. The wire array structure in the shape of a projecting hexagon described above has high shape stability of the bead core 11 as compared with a wire array structure in the shape of a recessed hexagon (see FIG. 10 described below) having a vertex projecting inward, so that the core-collapse resistance of the bead core 11 is properly ensured. The wire array structure in the shape of a hexagon with obtuse internal angles also has higher core-collapse resistance of the bead core 11 than a wire array structure in the shape of a polygon with an acute internal angle.

For example, in the structure of FIG. 3, the bead wires 111 are each a steel wire with a circular cross section with a constant outer diameter, and the wire cross sections are arrayed in the close-packed manner described above. As a result, all of the internal angles of the hexagon are approximately 120 degrees, and specifically within the range of from 105 degrees to 135 degrees.

In FIG. 3, a vertex P1 of the hexagon on the radially innermost side of the bead core 11 is defined as the first vertex. The hexagonal has a side S12 including the first vertex P1 and extending outward in the tire lateral direction that is defined as a first side. In addition, an axis parallel to the first side S12 of the hexagon is defined as an X-axis, and an axis perpendicular to the X-axis is defined as a Y-axis. The rim-fitting surface of the bead portion is inclined (see FIG. 2), so that the X-axis inclines outward in the tire radial direction toward the outside in the tire lateral direction.

At this time, a layer number M of wire cross sections in the Y-axis direction and a maximum value N_max of an array number N of wire cross sections in the X-axis direction preferably have the following relationship: $0.75 \leq M/N\_max \leq 1.30$, and more preferably have the following relationship: $0.95 \leq M/N\_max \leq 1.20$. As a result, an aspect ratio of the bead core 11 is optimized. In other words, the lower limit of M/N_max described above prevents the bead core 11 from being excessively increased in width, so that material costs of the bead core 11 and peripheral members (in particular, the bead filler 12) are reduced. In addition, the upper limit of M/N_max described above prevents the bead core 11 from being vertically increased in length in the Y-axis direction, so that torsional rigidity of the bead core 11 is properly ensured. In a heavy duty tire for a truck and a bus, the maximum value N_max of the array number N of wire cross sections in the X-axis direction is within the following range: $7 \leq N\_max \leq 13$.

When a row of the wire cross sections arrayed in the X-axis direction along the first side S12 of the hexagon is indicated as an innermost layer, the layer number M of the wire cross sections is defined as the number of layers of the wire cross sections layered on the innermost layer in a close-packed manner in the Y-axis direction.

The array number N of the wire cross sections is defined as the number of the wire cross sections constituting each of the layers of the wire cross sections.

For example, in the structure of FIG. 3, a single bead wire 111 is spirally wound in the X-axis direction to form a layer of wire cross sections. The single bead wire 111 is also wound back and forth in the X-axis direction to form a plurality of layers of wire cross sections. First, a layer of wire cross sections is formed in the first side S12 of the hexagon to serve as an innermost layer, and a plurality of layers of wire cross sections is layered in the Y-axis direction to form the bead core 11. This causes each of three pairs of opposite sides S12 and S45; S23 and S56; and S34 and S61, of the hexagon to be parallel to each other. In addition, a ratio M/N_max, i.e., a ratio of the layer number M of wire cross sections to the maximum value N_max of the array number N thereof, is as follows: M/N_max=8/8=1.00. In the structure described above, the layer of the wire cross section is layered in a direction orthogonal to the bead base portion 101 of the rim 10, so that the bead core 11 is increased strength to improve fitting of the tire on the rim.

In FIG. 3, a distance A in the tire lateral direction from the vertex P6 of the hexagon on the innermost side in the tire lateral direction to the centroid G of the hexagon, and a distance B in the tire lateral direction from the vertex P3 of the hexagon on the outermost side in the tire lateral direction to the centroid G of the hexagon, preferably have the relationship $1.05 \leq B/A$, and more preferably the relationship $1.06 \leq B/A$. This causes the centroid G of the hexagon, i.e., the centroid position of the bead core 11, to be optimized. In other words, the centroid of the bead core 11 is shifted toward the bead toe Bt (see FIG. 2) due to the lower limit of the ratio B/A. As a result, during inflating of the tire, when tension from the carcass layer 13 acts on the bead core 11, the tension is properly held by the bead core 11. This suppresses lifting deformation of the bead toe Bt. For example, in the structure of FIG. 3, the ratio B/A of the distances A and B in the tire lateral direction described above is as follows: B/A=1.07. While the upper limit of B/A is not particularly limited, it is subject to restrictions by conditions of the internal angle of the hexagon and the ratio M/N_max, described above.

The centroid G of the hexagon is calculated by an arithmetic mean of coordinates of the respective vertices P1 to P6 of the hexagon.

The distances A and B are each measured when a manufactured tire is mounted on a specified rim, and inflated to 5% of the specified internal pressure in an unloaded state. The tire shape at 5% of the specified internal pressure is closest to a tire shape in a tire vulcanization mold, i.e., a natural tire shape before inflation.

As illustrated in FIG. 4, the bead wire 111 is wound spirally at a predetermined pitch in the X-axis direction, so that a small gap g due to manufacturing error may be formed between adjacent wire cross sections in the X-axis direction. A smaller gap g is preferable because the bead core 11 increases in strength. Specifically, the gap g is preferably within the range as follows: $g \leq 0.08$ mm. The gap g and an inter-cord distance D1 between wire cross sections adjacent to each other in the X-axis direction preferably have the relationship $0.020 \leq g/D1 \leq 0.045$.

Meanwhile, the bead wire 111 is wound at tension, so that the wire cross sections are pressed in the Y-axis direction to crush the insulation rubbers 1112 in wire cross sections adjacent to each other in the Y-axis direction. Thus, the inter-cord distance D1 between the wire cross sections adjacent to each other in the X-axis direction and an inter-cord distance D2 between the wire cross sections adjacent to each other in the Y-axis direction have the relationship D2<D1. Inside the bead core 11, one wire cross section is supported by two wire cross sections in the Y-axis direction. As a result, the strength of the bead core 11 in the Y-axis direction, i.e., in the radial strength, is improved.

As illustrated in FIG. 3, the layer of the wire cross sections arrayed in the X-axis direction along the first side S12 of the hexagon, i.e., the innermost layer in the Y-axis direction, is inclined from the tire lateral direction by a predetermined inclination angle θ. This causes the bead core 11 to increase in inner diameter outward in the tire lateral direction from the first vertex P1 of the hexagon. The inclination angle θ is set such that the bead core 11 is parallel to the outer peripheral surface of the bead base portion 101 (see FIG. 2) of the rim 10 when the tire is mounted on the rim. In a typical heavy duty tire, the inclination angle θ is set at 15 degrees. As a result, when the tire is mounted on the rim, the innermost layer in the Y-axis direction of the bead core 11 faces the bead base portion 101 to efficiently enhance fitting of the bead portion on the rim.

The structure illustrated in FIG. 3 is formed such that a side S23 of the hexagon is parallel to the outer peripheral surface of the rim flange portion 102 (see FIG. 2) of the rim 10 when the tire is mounted on the rim. As a result, when the tire is mounted on the rim, an end surface of the bead core 11 outward in the tire lateral direction faces the rim flange portion 102 to efficiently enhance fitting of the bead portion on the rim.

In FIG. 3, it is preferable that the array numbers N12 and N45; N23 and N56; and N34 and N61 of the wire cross sections in the corresponding three pairs of the opposite sides S12 and S45; S23 and S56; and S34 and S61, of the hexagon, satisfy the condition as follows: 2≤N12−N45=N34−N61=N56−N23≤3. In other words, in a structure in which wire cross sections each having the same diameter are disposed in the shape of a projecting hexagon in a close-packed manner (see FIG. 4), the wire array structure preferably satisfies any one of conditions as follows: (1) N12−N45=N34−N61=N56−N23=2; and (2) N12−N45=N34−N61=N56−N23=3.

The array numbers N12 to N61 of the wire cross sections are defined as the numbers of wire cross-sections including corresponding vertices P1 to P6 of the hexagon. For example, the structure of FIG. 3 satisfies the condition as follows: N12−N45=N34−N61=N56−N23=2, where N12=6, N23=3, N34=6, N45=4, N56=5, and N61=4.

In the structure described above, the array number N12 of the wire cross sections in the innermost layer in the Y-axis direction (the first side S12 of the hexagon) is more than the array number N45 of wire cross sectionals in the outermost layer (the side S45 of the hexagon). As a result, the bead core 11 has a shape with an inner peripheral surface widened. In addition, the array numbers N23 and N61 of the wire cross sections in the corresponding two sides S23 and S61 adjacent to the innermost layer in the Y-axis direction are respectively less than the array numbers N56 and N34 of wire cross sections of the corresponding opposing sides S56 and S34. As a result, the bead core 11 has a shape with widened sides (the sides S56 and S34 of the hexagon) on its outer peripheral surface side. This increases strength efficiency of the bead core 11.

The following condition: N12−N45=N34−N61=N56−N23=2, is satisfied, so that the centroid G of the bead core 11 is properly shifted toward the bead toe Bt to ensure an effect of suppressing lifting deformation of the bead toe Bt. In addition, the following condition: N12−N45=N34−N61=N56−N23=3, is satisfied, so that an increase in material costs of the peripheral members of the bead core 11 is suppressed.

The array number N12 of the wire cross sections in the first side S12 of the hexagon is preferably within the range as follows: 5≤N12≤8, and more preferably within the range as follows: 6≤N12≤7. As a result, a length of the side S12 facing the bead base portion 101 (see FIG. 2) is properly ensured to properly ensure action of reinforcing fitting on the rim using the bead core 11.

The array number N23 of the wire cross sections in the side S23 outward in the tire lateral direction adjacent to the first side S12 of the hexagon is preferably within the range as follows: 2≤N23≤5, and more preferably within the range as follows: 3≤N23≤4. The side S23 facing the rim flange portion 102 of the rim 10 (see FIG. 2) receives large reaction force acting from the rim flange portion 102, so that the bead core 11 tends to easily collapse on the rim. Thus, when the array number N23 of the wire cross sections at this position is properly ensured, the bead core 11 is effectively prevented from collapsing on the rim.

The array number N23 of the wire cross sections in the side S23 outward in the tire lateral direction adjacent to the first side S12 of the hexagon and the array number N61 of the wire cross sections in the side inward in the tire lateral direction adjacent thereto preferably have the relationship 1≤N61−N23, and more preferably have the relationship 2≤N61−N23. Thus, in a region radially inward of the bead core 11 in the Y-axis direction, the side S23 facing the rim flange portion 102 (see FIG. 2) of the rim 10 is shorter than the side S61 on a bead toe Bt side. This enables a position of the centroid G of the hexagon to be efficiently shifted toward the bead toe Bt. While the upper limit of a difference between N61 and N23 is not particularly limited, it is subject to restrictions by conditions of the internal angle of the hexagon and the ratio M/N_max, described above.

As described above, the array numbers of the wire cross sections on the respective opposite sides of the hexagon satisfy the relationship N34−N61=N56−N23. Thus, when the array numbers N23 and N61 of the wire cross sections in the corresponding sides S23 and S61 in the region radially inward of the bead core 11 in the Y-axis direction satisfy the condition described above as follows: 1≤N61=N23, the array number N34 of the wire cross sections in the side S34 outward in the tire lateral direction adjacent to the outermost side S45 in the Y-axis direction of the hexagon and the array number N56 of the wire cross sections in the side S56 inward in the tire lateral direction have the relationship 1≤N34−N56.

In addition, the array number N12 of the wire cross sections in the first side S12 of the hexagon and the maximum value N_max of the array number N of the wire cross sections in the X-axis direction have the relationship 1≤N_max−N12, as a premise, and preferably have the relationship 2≤N_max−N12. This enables a position of the centroid G of the hexagon to be efficiently shifted toward the bead toe Bt.

In addition, a difference in array numbers N of the wire cross sections in any layers adjacent to each other in the Y-axis direction is −1, 0, or 1. In other words, the wire array structure of the bead core 11 is formed such that an increase or decrease in the number of turns of the bead wire 111 is at most one time in the Y-axis direction. This improves the shape stability of the wire array structure, so that collapse resistance of the bead core 11 on a rim is improved.

As illustrated in FIG. 3, the hexagonal centroid G is preferably positioned radially inward, in the Y-axis direction, of a central position Yc of the bead core 11 in the Y-axis direction. This improves the shape stability of the wire array structure, so that collapse resistance of the bead core 11 on a rim is improved.

The conditions imposed on the wire array structure of the bead core 11 described above may be sufficient to be satisfied in a region of 50% or more of the bead core 11 in the tire circumferential direction, and more specifically in a majority of a region excluding a starting end of winding and an ending end of winding of the bead wire 11.

Modified Examples

FIGS. 5 to 8 are each an explanatory diagram of a modified example of the wire array structure of the bead core 11 illustrated in FIG. 3. These drawings each illustrate an enlarged view of a single bead core 11 in an unvulcanized state.

The wire arrangement of the bead core 11 is not limited to the structure illustrated in FIG. 3 and can be appropriately changed within a range satisfying the conditions described above.

Figure 5:
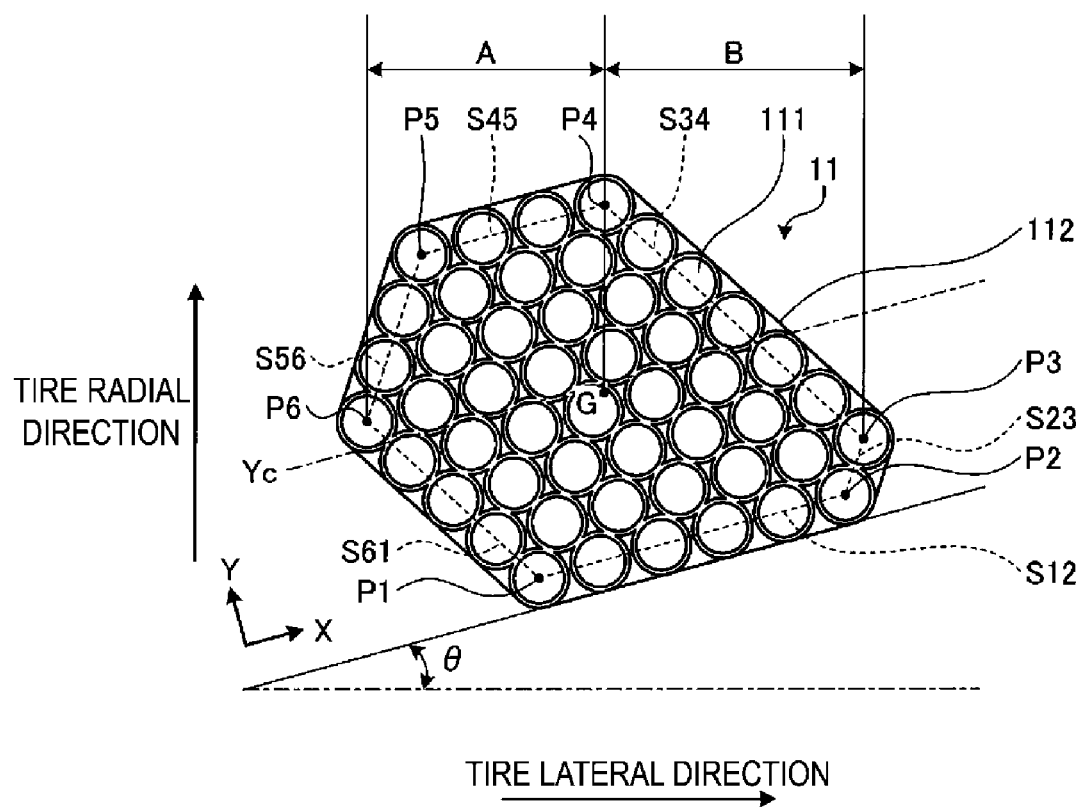
FIG. 5 is an explanatory diagram illustrating a modified example of a wire array structure of the bead core illustrated in FIG. 3.

For example, in the example of FIG. 5, a wire array structure of a bead core 11 is a projecting hexagon with an obtuse internal angle, where a ratio M/N_max, i.e., a ratio of a layer number M of wire cross sections in the Y-axis direction to a maximum value N_max of an array number N of the wire cross sections in the X-axis direction, is as follows: M/N_max=1.14, and a ratio B/A of a distance A in the tire lateral direction from a vertex P6 of the hexagon on the innermost side in the tire lateral direction to the centroid G of the hexagon, and a distance B in the tire lateral direction from a vertex P3 of the hexagon on the outermost side in the tire lateral direction to the centroid G of the hexagon, is as follows: B/A=1.09. In addition, array numbers N12 to N61 of the wire cross sections in the corresponding sides S12 to S61 of the hexagon satisfy the following: N12−N45=N34−N61=N56−N23=2, where N12=6, N23=2, N34=6, N45=4, N56=4, and N61=5.

Figure 6:
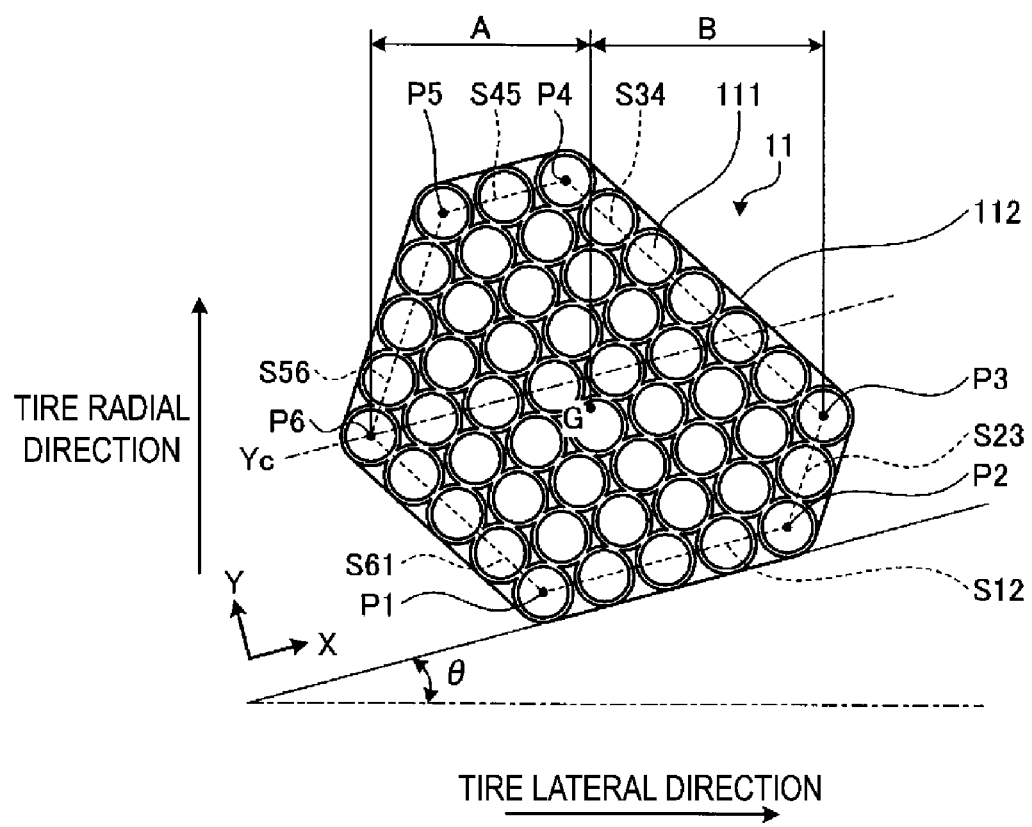
FIG. 6 is an explanatory diagram illustrating a modified example of the wire array structure of the bead core illustrated in FIG. 3.

In the example of FIG. 6, a wire array structure of a bead core 11 is a projecting hexagon with an obtuse internal angle, where a ratio M/N_max is as follows: M/N_max=1.29, a ratio B/A is as follows: B/A=1.08, and array numbers N12 to N61 of the wire cross sections satisfy the following: N12−N45=N34−N61=N56−N23=2, where N12=5, N23=3, N34=7, N45=3, N56=5, and N61=5.

Figure 7:
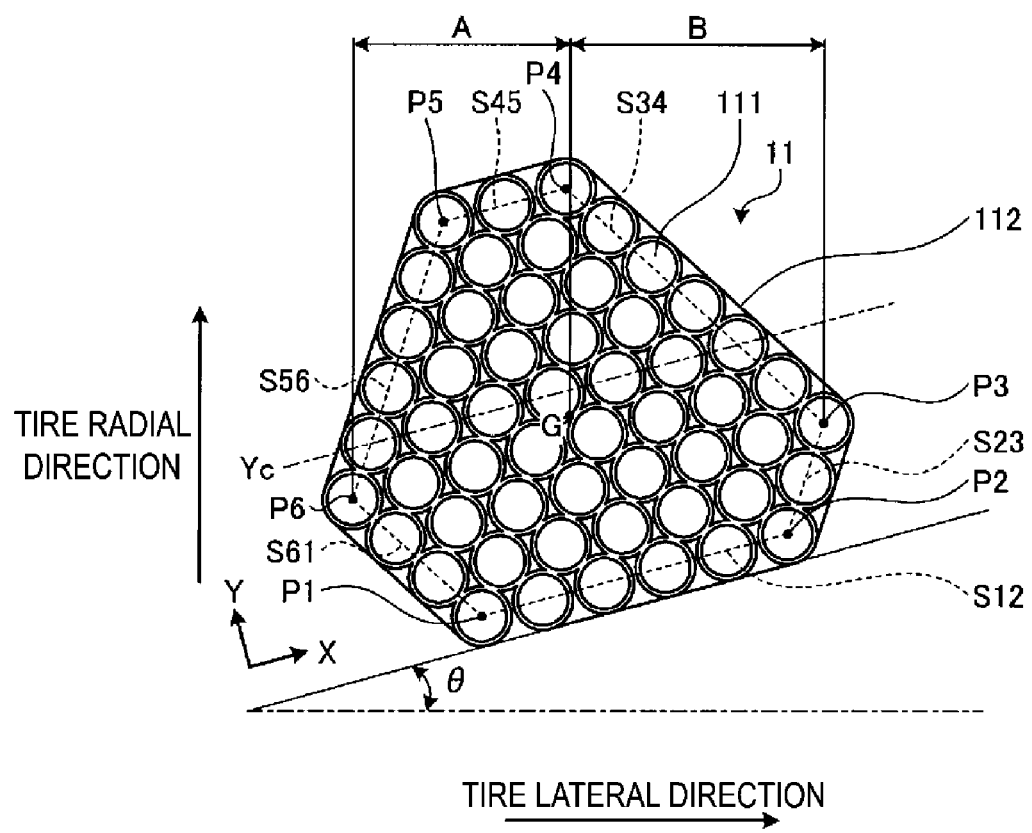
FIG. 7 is an explanatory diagram illustrating a modified example of the wire array structure of the bead core illustrated in FIG. 3.

In the example of FIG. 7, a wire array structure of a bead core 11 is a projecting hexagon with an obtuse internal angle, where a ratio M/N_max is as follows: M/N_max=1.13, a ratio B/A is as follows: B/A=1.12, and array numbers N12 to N61 of the wire cross sections satisfy the following: N12−N45=N34−N61=N56−N23=3, where N12=6, N23=3, N34=7, N45=3, N56=6, and N61=4.

Figure 8:
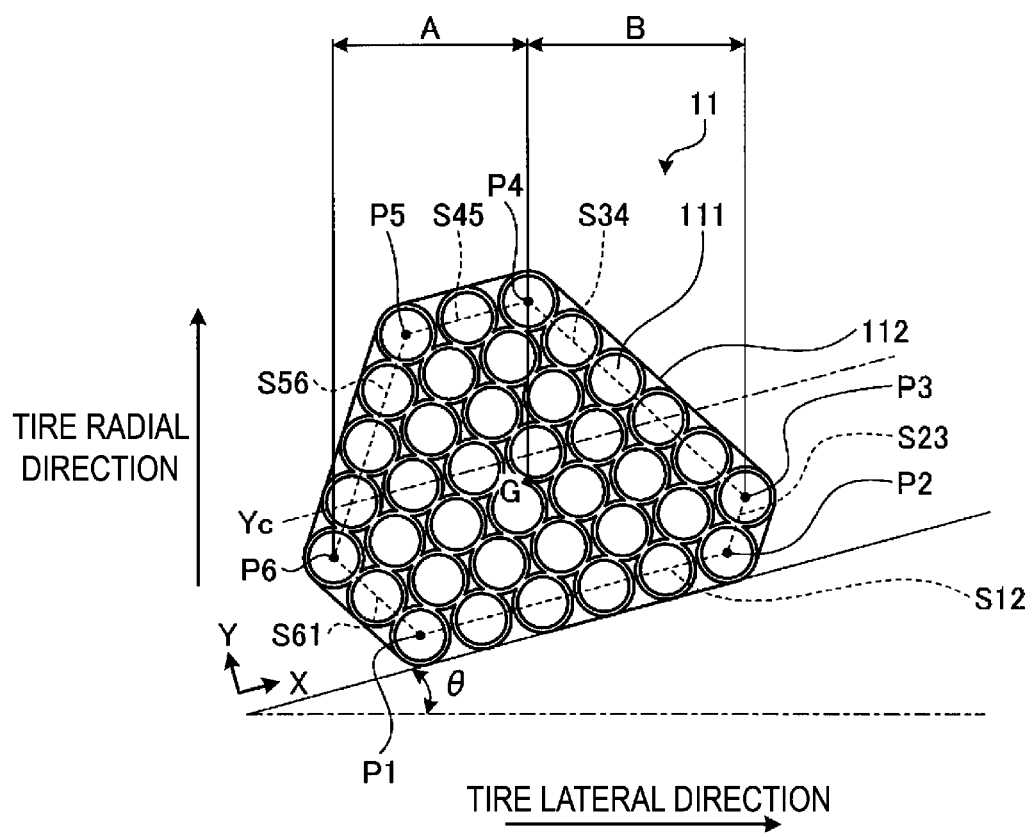
FIG. 8 is an explanatory diagram illustrating a modified example of the wire array structure of the bead core illustrated in FIG. 3.

In the example of FIG. 8, a wire array structure of a bead core 11 is a projecting hexagon with an obtuse internal angle, where a ratio M/N_max is as follows: M/N_max=1.00, a ratio B/A is as follows: B/A=1.13, and array numbers N12 to N61 of the wire cross sections satisfy the following: N12−N45=N34−N61=N56−N23=3, where N12=6, N23=2, N34=6, N45=3, N56=5, and N61=3. In the example of FIG. 8, a bead wire 111 has a small total number of turns, an effect of suppressing lifting deformation of a bead toe Bt is less than that of the example of FIG. 3. However, the example of FIG. 8 has higher strength efficiency described below than another wire array structure with a total number of turns of the bead wire 111 at the same level, so that lifting deformation of the bead toe Bt can be efficiently suppressed.

Effects

As described above, the pneumatic tire 1 includes the pair of bead cores 11 each formed by winding the bead wire 111 multiple times in an annular shape (see FIG. 3). In a cross-sectional view of the bead core 11 in its radial direction, the bead core 11 has a wire array structure in the shape of a hexagon formed by winding one or more of the bead wires 111 in a close-packed manner (see FIG. 4). The hexagon is a projecting hexagon with an obtuse internal angle at every vertex. In addition, the layer number M of the wire cross sections in the Y-axis direction and the maximum value N_max of the array number N of the wire cross sections in the X-axis direction have the relationship $0.75 \leq M/N\_max \leq 1.30$. Further, the distance A in the tire lateral direction from the vertex P6 of the hexagon on the innermost side in the tire lateral direction to the centroid G of the hexagon, and the distance B in the tire lateral direction from the vertex P3 of the hexagon on the outermost side in the tire lateral direction to the centroid G of the hexagon, have the relationship $1.05 \leq B/A$.

In the structure described above, (1) the bead core 11 has the wire array structure in the shape of a projecting hexagon formed by winding the bead wire 111 in a close-packed manner (see FIG. 4) with an obtuse internal angle, so that there is an advantage in that the shape stability of the bead core 11 is high and core-collapse resistance of the bead core 11 is properly ensured as compared to a wire array structure in the shape of a recessed hexagon (see FIG. 10 described below) having an vertex projecting inward, for example. In addition, (2) there is an advantage in that the aspect ratio M/N_max of the bead core 11 is optimized, the material costs of the bead core 11 and the peripheral members (in particular, the bead filler 12) are reduced, and the torsional rigidity of the bead core 11 is properly ensured. Further, (3) there is an advantage in that a shift of the centroid position of the bead core 11 is optimized due to the ratio B/A to properly suppress lifting deformation of the bead toe Bt.

The pneumatic tire 1 includes the pair of bead cores 11 each formed by winding the bead wire 111 multiple times in an annular shape (see FIG. 3). In a cross-sectional view of the bead core 11 in its radial direction, the bead core 11 has a wire array structure in the shape of a hexagon formed by winding one or more of the bead wires 111 in a close-packed manner. The hexagon is a projecting hexagon with an obtuse internal angle at every vertex. In addition, the array numbers N12 and N45; N23 and N56; and N34 and N61 of the wire cross sections in the corresponding three pairs of the opposite sides S12 and S45; S23 and S56; and S34 and S61, of the hexagon, satisfy the condition as follows: $2 \leq N12-N45 = N34-N61 = N56-N23 \leq 3$.

In the structure described above, (1) the bead core 11 has the wire array structure in the shape of a projecting hexagon formed by winding the bead wire 111 in a close-packed manner (see FIG. 4) with an obtuse internal angle, so that there is an advantage in that the shape stability of the bead core 11 is high and core-collapse resistance of the bead core 11 is properly ensured compared to a wire array structure in the shape of a recessed hexagon (see FIG. 10 described below) having an vertex projecting inward, for example. In addition, (2) when the three pairs of the opposing sides S12 and S45; S23 and S56; and S34 and S61 of the hexagon satisfy the condition described above, there is an advantage in that the hexagonal shape of the wire array structure is optimized to increase the strength efficiency of the bead core 11, and the centroid G of the bead core 11 is properly shifted toward the bead toe Bt to ensure the effect of suppressing the lifting deformation of the bead toe Bt.

The pneumatic tire 1 is configured such that the layer number M of the wire cross sections in the Y-axis direction and the maximum value N_max of the array number N of the wire cross sections in the X-axis direction have the relationship $0.75 \leq M/N\_max \leq 1.30$ (see FIG. 3). As a result, there is an advantage in that the aspect ratio M/N_max of the bead core 11 is optimized, the material costs of the bead core 11 and the peripheral members (in particular, the bead filler 12) are reduced, and the torsional rigidity of the bead core 11 is properly ensured.

In the pneumatic tire 1, all of the internal angles of the hexagon are within the range from 105 degrees to 135 degrees (see FIG. 3). As a result, there is an advantage in that the wire cross sections of the bead core 11 is properly arrayed in a close-packed manner to properly ensure the core-collapse resistance of the bead core 11.

The pneumatic tire 1 is also configured such that the bead wire 11 is spirally wound in the X-axis direction to form a layer of wire cross sections, and a plurality of the layers of wire cross sections is layered in the Y-axis direction on the first side S12 of the hexagon, serving as the innermost layer, to form the bead core 11 (see FIG. 3). In the structure described above, the layers of the wire cross sections are layered in a direction orthogonal to the bead base portion 101 of the rim 10, so that there is an advantage in that the bead core 11 is increased in strength to improve fitting of the tire on the rim.

The pneumatic tire 1 also includes the bead core 11 that has the wire array structure in the shape of a hexagon formed by winding one bead wire 11 in a close-packed manner (see FIG. 3). As a result, there is an advantage in that density of placement of the wire cross sections of the bead core 11 is increased to improve the core-collapse resistance of the bead core 11.

The pneumatic tire 1 is also configured such that the array number N12 of the wire cross sections in the first side S12 of the hexagon is within the range as follows: 5≤N12 (see FIG. 3). As a result, there is an advantage in that the length of the side S12 facing the bead base portion 101 (see FIG. 2) is properly ensured and the action of reinforcing fitting on the rim using the bead core 11 is properly ensured.

The pneumatic tire 1 is also configured such that the array number N23 of the wire cross sections in the side S23 outward in the tire lateral direction, adjacent to the first side S12 of the hexagon, is within the range as follows: 2≤N23 (see FIG. 3). As a result, there is an advantage in that the bead core 11 is effectively prevented from collapsing on the rim.

The pneumatic tire 1 is also configured such that the array number N23 of the wire cross sections in the side S23 outward in the tire lateral direction, adjacent to the first side S12 of the hexagon, and the array number N61 of the wire cross sections in the side S61 inward in the tire lateral direction, adjacent thereto, have the relationship 1≤N61−N23 (see FIG. 3). As a result, there is an advantage in that a position of the centroid G of hexagon can be efficiently shifted toward the bead toe Bt.

The pneumatic tire 1 is also configured such that the array number N12 of the wire cross sections in the first side S12 of the hexagon and the maximum value N_max of the array number N of the wire cross sections in the X-axis direction have the relationship 1≤N_max−N12 (see FIG. 3). As a result, there is an advantage in that a position of the centroid G of hexagon can be efficiently shifted toward the bead toe Bt.

The pneumatic tire 1 is also configured such that the difference in array numbers N of the wire cross sections in any layers adjacent to each other in the Y-axis direction is −1, 0, or 1 (see FIG. 3). As a result, there is an advantage in that the shape stability of the wire array structure is improved and the collapse resistance of the bead core 11 on a rim is improved.

The pneumatic tire 1 is also configured such that the centroid G of the hexagon is positioned inward in the Y-axis direction of the layer of the bead wire 111 positioned in the center in the Y-axis direction of the bead core 11 (see FIG. 3). As a result, there is an advantage in that the shape stability of the wire array structure is improved and the collapse resistance of the bead core 11 on a rim is improved.

The pneumatic tire 1 is also includes the carcass layer 13 that extends between the pair of bead cores 11, 11 (see FIG. 2). In addition, both end portions of the carcass layer 13 are turned back outward in the tire lateral direction wrapping around the corresponding bead cores 11 and fixed (see FIG. 2). In the carcass structure described above, lifting deformation of the bead toe Bt is less likely to occur due to tension from the carcass layer 13. Thus, when a tire having the carcass structure described above is used, there is an advantage in that the effect of suppressing lifting deformation of the bead core Bt can be efficiently obtained due to the wire array structure of the bead core 11 described above.

EXAMPLES

FIGS. 9A-9C include a table showing the results of performance tests of pneumatic tires according to embodiments of the present technology. FIGS. 10 to 23 respectively illustrate Conventional Examples 1 and 2, and Comparative Examples 1 to 12, shown in FIGS. 9A-9C.

In the performance tests, a plurality of types of test tire was evaluated for the following: (1) toe-deformation resistance; (2) strength efficiency; and (3) low cost. Then, pneumatic tires each with a tire size of 275/70R22.5 were mounted on standard rims specified by JATMA, and 75% of the internal pressure specified by JATMA and 140% of the load specified by JATMA were applied to each of the pneumatic tires. The test tires were each mounted on the test vehicle of a track for all wheels of 6 by 2.

(1) The toe-deformation resistance was evaluated by performing a low-pressure durability test using an indoor drum testing machine. Then, an amount of lifting deformation in a bead toe portion of each test tire was measured after traveling for a distance of 40000 km, and measurement results are expressed as index values and evaluated with Conventional Example 1 being assigned as the reference (100). In this evaluation, larger values are preferable.

(2) The strength efficiency was evaluated by calculating a ratio of an inverse of the amount of lifting deformation in the bead toe portion measured in the above (1) to the number of total winding times of a bead wire in one bead core, and calculation results are expressed as index values and evaluated with Conventional Example 1 being assigned as the reference (100). In this evaluation, larger values are preferable.

(3) The low cost was evaluated by calculating the material cost of the bead core 11 and the peripheral members (in particular, the bead filler 12), and calculation results are expressed as index values and evaluated with Conventional Example 1 being assigned as the reference (100). In this evaluation, larger values are preferable.

The test tires of Example 1 each have the structure of each of FIGS. 1 to 4. The test tires of Examples 2 to 5 are each a modified example of Example 1, and include the wire array structures of FIGS. 5 to 8, respectively. In each of Examples 1 to 5, the wire 1111 of the bead wire 111 is a steel cord with an outer diameter of 1.55 mm, and is covered with the insulation rubber 1112.

The test tires of Conventional Examples 1 and 2, and Comparative Examples 1 to 12, include the wire array structures of FIGS. 10 to 23, respectively.

As can be seen from the test results, the test tires of Examples 1 to 5 each achieved (1) the toe-deformation resistance, (2) the strength efficiency, and (3) the low cost, in a compatible manner.

The invention claimed is:

1. A pneumatic tire, comprising:
a pair of bead cores each formed by winding one or more bead wires multiple times in an annular shape,
the bead cores each having a wire array structure in a shape of a hexagon formed by winding the one or more of the bead wires in a close-packed manner in a cross-sectional view of each of the bead cores in its radial direction,
the hexagon being a projecting hexagon with an obtuse internal angle at every vertex,
a vertex of the hexagon on a radially innermost side of each of the bead cores being defined as a first vertex P1, a side of the hexagon extending outward in a tire lateral direction and including the first vertex P1 being defined as a first side S12, an axis parallel to the first side S12 of the hexagon being defined as an X-axis, and an axis perpendicular to the X-axis being defined as a Y-axis, a layer number M of wire cross sections in a Y-axis direction, and a maximum value N_max of an array number N of wire cross sections in an X-axis direction, having a relationship satisfying $0.95 \leq M/N\_max \leq 1.30$, and a distance A in the tire lateral direction from a vertex of the hexagon on an innermost side in the tire lateral direction to a centroid of the hexagon, and a distance B in the tire lateral direction from a vertex of the hexagon on an outermost side in the tire lateral direction to the centroid of the hexagon, having a relationship satisfying $1.05 \leq B/A$; wherein a side S23 outward in the tire lateral direction, adjacent to the first side S12 of the hexagon, is shorter than a side S61 inward in the tire lateral direction, adjacent thereto.

2. The pneumatic tire according to claim 1, wherein the one or more bead wires are spirally wound in the X-axis direction to form layers of the wire cross sections, and the layers of the wire cross sections are layered in the Y-axis direction on the first side S12 of the hexagon, serving as an innermost layer, to form each bead core of the pair of bead cores.

3. The pneumatic tire according to claim 1, wherein an array number N12 of the wire cross sections in the first side S12 of the hexagon is within a range as follows: $5 \leq N12$.

4. The pneumatic tire according to claim 1, wherein an array number N23 of the wire cross sections in the side S23 outward in the tire lateral direction, adjacent to the first side S12 of the hexagon, is within a range as follows: $2 \leq N23$.

5. The pneumatic tire according to claim 1, wherein an array number N23 of the wire cross sections in the side S23 outward in the tire lateral direction, adjacent to the first side S12 of the hexagon, and an array number N61 of the wire cross sections in the side S61 inward in the tire lateral direction, adjacent thereto, have a relationship $1 \leq N61-N23$.

6. The pneumatic tire according to claim 1, wherein an array number N12 of the wire cross sections in the first side S12 of the hexagon and the maximum value N_max of the array number N of the wire cross sections in the X-axis direction have a relationship $1 \leq N\_max-N12$.

7. The pneumatic tire according to claim 1, further comprising:

a carcass layer extending between the pair of bead cores, wherein:

both end portions of the carcass layer are turned back outward in the tire lateral direction and are wrapped around corresponding bead cores and fixed;

a difference in array numbers N of the wire cross sections in any layers adjacent to each other in the Y-axis direction is $-1$, 0, or 1; and the centroid of the hexagon is positioned inward in the Y-axis direction of a layer of the one or more bead wires positioned in a center in the Y-axis direction of each bead core of the pair of bead cores.

8. A pneumatic tire, comprising:

a pair of bead cores each formed by winding one or more bead wires multiple times in an annular shape, the bead cores each having a wire array structure in a shape of a hexagon formed by winding the one or more of the bead wires in a close-packed manner in a cross-sectional view of each of the bead cores in its radial direction, the hexagon being a projecting hexagon with an obtuse internal angle at every vertex, a vertex of the hexagon on a radially innermost side of each of the bead cores being defined as a first vertex P1, a side of the hexagon extending outward in a tire lateral direction and including the first vertex P1 being defined as a first side S12, an axis parallel to the first side S12 of the hexagon being defined as an X-axis, and an axis perpendicular to the X-axis being defined as a Y-axis, an array number of wire cross sections in each side of the hexagon being defined as N12, N23, N34, N45, N56, and N61 in order from the first side S12 of the hexagon outward in the tire lateral direction, and an array number of the wire cross sections in each of three pairs of opposing sides of the hexagon satisfying a relationship $2 \leq N12-N45=N34-N61=N56-N23 \leq 3$; wherein the array number N23 of the wire cross sections in a side S23 outward in the tire lateral direction, adjacent to the first side S12 of the hexagon, and the array number N61 of the wire cross sections in a side S61 inward in the tire lateral direction, adjacent thereto, have the relationship $1 \leq N61-N23$, and a side S45, opposite the first side S12 and being connected to the first side S12 by the side S23 and a side S34 at one end in the tire lateral direction and being connected to the first side S12 by the side S61 and a side S56 at another end in the tire lateral direction, is parallel to the first side S12.

9. The pneumatic tire according to claim 8, wherein a layer number M of the wire cross sections in a Y-axis direction and a maximum value N_max of the array number N of the wire cross sections in an X-axis direction have a relationship $0.75 \leq M/N\_max \leq 1.30$.

10. The pneumatic tire according to claim 8, wherein all internal angles of the hexagon are within a range of from 105 degrees to 135 degrees.

11. The pneumatic tire according to claim 8, wherein the one or more bead wires of each bead core of the pair of bead cores are spirally wound in an X-axis direction to form layers of the wire cross sections, and the layers of the wire cross sections are layered in a Y-axis direction on the first side S12 of the hexagon, serving as an innermost layer, to form the bead core.

12. The pneumatic tire according to claim 8, wherein the array number N12 of the wire cross sections in the first side S12 of the hexagon is within a range as follows: $5 \leq N12$.

13. The pneumatic tire according to claim 8, wherein the array number N23 of the wire cross sections in the side S23 outward in the tire lateral direction, adjacent to the first side S12 of the hexagon, is within a range as follows: $2 \leq N23$.

14. The pneumatic tire according to claim 8, wherein the array number N12 of the wire cross sections in the first side S12 of the hexagon and a maximum value N_max of the array number N of the wire cross sections in an X-axis direction have a relationship $1 \leq N\_max-N12$.

15. The pneumatic tire according to claim 8, wherein a difference in array numbers N of the wire cross sections in any layers adjacent to each other in a Y-axis direction is $-1$, 0, or 1.

16. The pneumatic tire according to claim 8, wherein a centroid of the hexagon is positioned inward in a Y-axis direction of a layer of the one or more bead wires positioned in a center in a Y-axis direction of each bead core of the pair of bead cores.

17. The pneumatic tire according to claim 8, further comprising:

a carcass layer extending between the pair of bead cores, wherein both end portions of the carcass layer are turned back outward in the tire lateral direction and are wrapped around corresponding bead cores and fixed.

18. The pneumatic tire according to claim 8, wherein each of the three pairs of opposing sides of the hexagon are parallel to one another.

\* \* \* \* \*